UNITED STATES PATENT OFFICE.

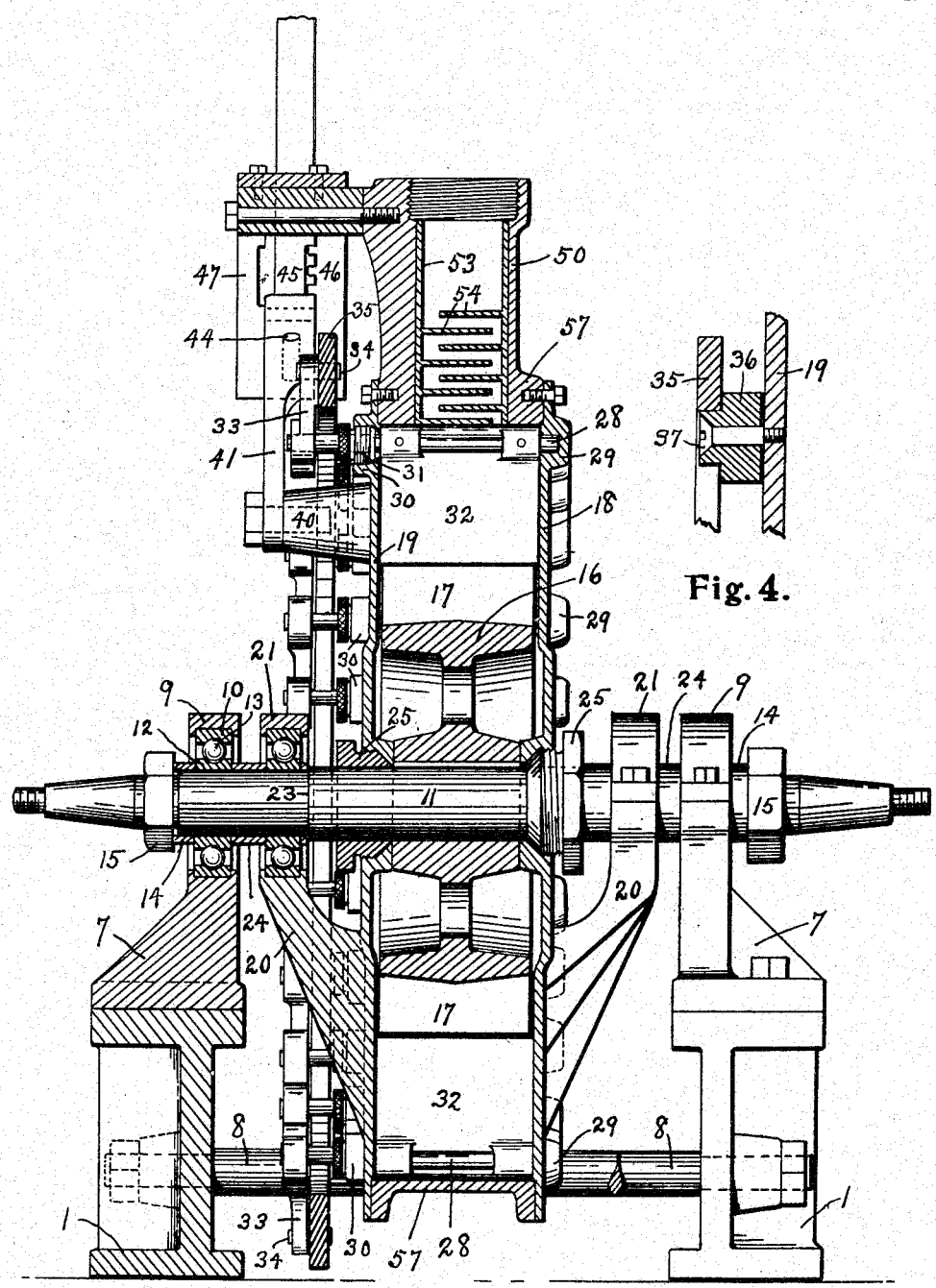

THOMAS THOMPSON, OF DUBUQUE, IOWA.

EGG-WASHER.

No. 929,804.  Specification of Letters Patent.  Patented Aug. 3, 1909.

Application filed May 29, 1908. Serial No. 435,823.

*To all whom it may concern:*

Be it known that I, THOMAS THOMPSON, citizen of the United States, residing at Dubuque, in the county of Dubuque and State of Iowa, have invented certain new and useful Improvements in Egg-Washers, of which the following is a specification.

In the sale of eggs it has been found that those with clean shells have a larger commercial value than those that are soiled but the cost of labor in washing and cleaning the egg by hand or in a limited way by machinery has nearly if not entirely equaled the extra percentage of gain in the price from the fact that only a few were cleansed together at the same time.

The object of my invention is to provide a simple and inexpensive device which can be operated by unskilled labor and by which one or more cases of eggs can be thoroughly cleansed at the same time.

In what it consists, the mode of construction and the manner of operation will be fully described and shown in the following specification when taken in connection with the drawings accompanying the same and forming a part hereof.

Figure 1 is a perspective view of my device. Fig. 2 is a cross section of the egg receptacle showing the water and meal therein. Fig. 3 is an inside end view. Fig. 4 is a perspective view of the removable tray. Fig. 5 is a plan view of the bottom of the tray shown in Fig. 4. Fig. 6 is a cross sectional view showing the eggs and meal while the eggs are being washed. Fig. 7 is an end view of the tray.

Like characters of reference denote corresponding parts in each of the figures.
Referring to the drawings, 2 represents the tank which is preferably rectangular, with a portion 4 of the bottom curved downward near one end, and provided with the legs 5. This tank may be cheaply made of wood and lined with zinc or other metal. In the tank 2 is pivoted a drum or other egg receptacle 6 by pivot pins or journals secured to the center of the receptacle at each end and projecting through and having their bearings in the sides of the tank 2 and legs 5. The journal 7 projects through the leg 5 and to its outer end is attached a crank 9 for rotating or moving the receptacle in the water. When it is desired to rotate the receptacle by power then instead of the crank 9 there is attached to the journal 7 a drive pulley which is belted to the power.

On the inside of the receptacle there are secured longitudinally bars or carriers 8 for the purposes presently to appear. Through the opposite sides of the receptacle are rectangular openings extending the length of the receptacle, in which are removably secured doors or covers 10 held in place by spring catches 11, secured to the opposite ends of the receptacle and adapted to engage the top of the covers 10.

To the under side of the covers against or near their longitudinal edges are secured one-half of a carrier 13 similar to the carrier 8 and on the inner longitudinal edge of the receptacle is one-half of a carrier 12 and when the covers are secured in the openings the half carriers 12 and 13 form a single carrier of the size and shape of the carrier 8. The object of the construction is to strengthen the covers and make them a better fit by the half carrier 13 contacting with the half carrier 12.
In the opposite ends of the receptacle are fastened two parallel sustaining guides 14 upon which a tray hereinafter to be described is adapted to slide and be sustained. Connected with this receptacle is a tray 15 shown in Figs. 4, 5 and 7 which is of general rectangular shape except that the lower rear edge is rounded at 19 and consists of a frame 17 of substantially the same height as the width of the openings in the receptacle. The bottom of the tray is composed of wire forming a mesh of about half or two-thirds the size of an ordinary egg. Through one of the legs 5 and base of the tank is a hole 20 for the purpose of drawing off the water and granular material in the tank and egg receptacle.

In connection with this device for washing the eggs, there is used some granular material, mixed with the water in the receptacle. I preferably use coarsely ground corn meal as this is only of a slightly greater specific gravity than water and can readily be stirred with the eggs and will cleanse them rapidly without the danger of breaking or injuring the shell.
The manner of operating my device is substantially as follows: The tank is filled nearly full with water, which also enters and fills the egg receptacle to the same height. One of the covers 10 is then removed and the meal or other granular material is placed in through the vanes 32 and that the more nearly these vanes assume radial position, the greater will be the pull; and that the more nearly the vanes assume the position shown in dotted lines in Fig. 2 the less will be the pull. The indicator 6 may be calibrated to indicate the power expended for a certain fixed number of revolutions of the shaft 11 and the position of the lever 41 will determine to a large extent this power expended. The revolutions of the shaft may be counted in any desirable manner.

As the revolutions of the spool 16 will have a tendency to expel the liquid through the connection 50 it may be necessary for extreme speeds to connect a stand pipe 52 at the upper end. To prevent too rapid a flow of liquid through this connection a sleeve 53 having cross vanes 54 may be employed.

This mechanism provides a variable internal resistance for dynamometers of this type and for given speeds for the same positions of the lever 42 the indicator 6 will be at rest.

Many changes may be made in the details of this machine without avoiding the spirit of my invention.

Having now explained my improvements, what I claim as my invention and desire to secure by Letters Patent is:—

1. In a dynamometer, the combination of a base, bearings mounted thereon, a shaft freely revoluble in said bearings, a wheel attached to the shaft and provided with flat radial buckets, a casing inclosing the wheel and comprising a cylindrical body and two heads, brackets attached to said heads and provided with bearings mounted on said shaft, stems mounted in said casing, vanes within the casing attached to said stems, levers on said stems outside of the casing, a ring mounted on the casing and provided with pins to engage the levers, a handle for positioning the ring, means to hold the handle in a plurality of positions, and means to indicate the stresses on the casing caused by the revolution of the shaft.

2. In a dynamometer, the combination of a revoluble shaft, means to support the same, a wheel attached to the shaft and provided with flat buckets, a casing revolubly mounted on the shaft and inclosing the wheel, stems mounted in the casing, vanes attached to the stems, and means for holding the vanes in a plurality of positions.

3. In a dynamometer, the combination of a frame, a shaft revolubly mounted thereon, a wheel on said shaft provided with projections, an oscillatory casing mounted on said shaft, adjustable vanes mounted in said casing, and means to adjust the vanes.

4. In a dynamometer, the combination of a revoluble member, a casing inclosing the same adapted to hold a liquid, adjustable means to control the resistance of the casing to the revoluble member because of the liquid, a connection to said casing to admit the liquid, and baffle plates in the connection to hinder the flow of the liquid.

5. In a dynamometer, the combination of a revoluble member, a relatively stationary member inclosing the same and adapted to hold a liquid, a series of adjustable members to control the resistance of the casing to the revoluble member because of the liquid, and means for simultaneously positioning all of the adjustable members.

In testimony whereof, I have signed this specification in the presence of two subscribing witnesses.

ERNEST E. SWEET.

Witnesses:
    WM. I. NASH,
    C. B. ELDREDGE.